United States Patent
Chiritescu (10) Patent No.: US 11,897,317 B2
(45) Date of Patent: Feb. 13, 2024

(54) INFRARED HEATING MODULE, VEHICLE AND SOFTWARE PROGRAM FOR PROVIDING CLIMATE CONTROL

(71) Applicant: Volvo Car Corporation, Gothenburg (SE)

(72) Inventor: Stefan Chiritescu, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 806 days.

(21) Appl. No.: 16/543,992

(22) Filed: Aug. 19, 2019

(65) Prior Publication Data
US 2021/0053421 A1    Feb. 25, 2021

(51) Int. Cl.
   *B60H 1/22*      (2006.01)
   *B60H 1/00*      (2006.01)

(52) U.S. Cl.
   CPC ....... *B60H 1/2225* (2013.01); *B60H 1/00021* (2013.01); *B60H 1/00207* (2013.01);
   (Continued)

(58) Field of Classification Search
   CPC .. B60H 1/2226; B60H 1/2225; B60H 1/2227; B60H 1/00021; B60H 1/00207; B60H 1/00742; B60H 1/2218; B60H 2001/00128; B60H 2001/0015; B60H 2001/00235; B60H 1/2215; B60H 1/2228; B60H 2001/224; B60H 2001/2246; B60H 2001/2256; B60H 2001/2259;
   (Continued)

(56) References Cited

U.S. PATENT DOCUMENTS 7,205,505 B2 * 4/2007 Diemer ............... H05B 3/34
                                                177/144
8,796,588 B2 * 8/2014 Berger ............... B60H 1/2227
                                                219/202
(Continued)

FOREIGN PATENT DOCUMENTS

DE    19647935 A1 * 5/1998 ........... B60H 1/2225
DE    10110142 A1 * 11/2002 ............... B60H 1/22
(Continued)

OTHER PUBLICATIONS

KR 20160039415A English machine translation (Year: 2016).*
WO-2015027974-A1 English Machine Translation (Year: 2015).*

*Primary Examiner* — Jenna M Hopkins
(74) *Attorney, Agent, or Firm* — Clements Bernard Walker; Christopher L. Bernard (57) ABSTRACT

An infrared (IR) heating module for a vehicle having a passenger cabin including at least one IR panel, a controller coupled to the at least one IR panel for controlling operation of the IR heating module, and a power supply coupled to the controller for supplying power to the IR heating module, where the at least one IR panel is adapted and configured to be installed in a roof within the passenger cabin of the vehicle. The IR heating module operates by detecting a temperature within a cabin of the vehicle based on an output of a thermostat within the vehicle, receiving a signal from the controller relating to the temperature detected, and initiating an operation of the at least one IR panel based on the received signal, where the at least one IR panel is installed within the roof of the vehicle.

20 Claims, 4 Drawing Sheets

(52) U.S. Cl.
CPC ....... *B60H 1/00742* (2013.01); *B60H 1/2218* (2013.01); *B60H 1/2227* (2019.05); *B60H 2001/0015* (2013.01); *B60H 2001/00128* (2013.01); *B60H 2001/00235* (2013.01)

(58) Field of Classification Search
CPC .... B60H 2001/2265; B60H 2001/2228; H05B 1/0236
See application file for complete search history.

(56) References Cited

U.S. PATENT DOCUMENTS

| | | | | |
|---|---|---|---|---|
| 8,859,938 | B2 * | 10/2014 | Eisenhour | B60H 1/00 219/202 |
| 8,884,191 | B2 * | 11/2014 | Ogino | B60N 2/5685 219/217 |
| 9,963,013 | B2 | 5/2018 | Satzger et al. | |
| 2010/0187211 | A1 * | 7/2010 | Eisenhour | B60H 1/2226 219/202 |
| 2010/0258645 | A1 * | 10/2010 | Hioki | B60H 1/2227 237/28 |
| 2011/0042988 | A1 * | 2/2011 | Alpert | B60H 1/2226 219/202 |
| 2015/0028116 | A1 * | 1/2015 | Satzger | B60H 1/2227 165/41 |
| 2015/0028119 | A1 * | 1/2015 | Satzger | B60H 1/2218 237/28 |
| 2018/0236848 | A1 * | 8/2018 | Kaminski | H05B 3/145 |
| 2019/0047367 | A1 * | 2/2019 | Elson | B60H 1/2226 |
| 2019/0315372 | A1 * | 10/2019 | Chen | B60J 1/2011 |
| 2020/0346516 | A1 * | 11/2020 | Yen | B60H 1/00742 |
| 2020/0346517 | A1 * | 11/2020 | Han | B60H 1/034 |
| 2021/0053421 | A1 * | 2/2021 | Chiritescu | B60H 1/00207 |
| 2021/0197643 | A1 * | 7/2021 | Yang | B60H 1/00742 |
| 2021/0283988 | A1 * | 9/2021 | De Pelsemaeker | B60R 13/02 |

FOREIGN PATENT DOCUMENTS

| | | | | |
|---|---|---|---|---|
| DE | 102012205873 | A1 * | 10/2013 | ........... B60H 1/2225 |
| DE | 102013214554 | A1 * | 1/2015 | ............... B60H 1/03 |
| DE | 102014210962 | A1 * | 1/2015 | ........ B60H 1/00742 |
| DE | 102015004308 | A1 * | 10/2016 | ............. A61L 9/013 |
| DE | 102015117645 | A1 | 4/2017 | |
| DE | 102019000334 | A1 * | 7/2020 | ........ B60H 1/00285 |
| DE | 102019108283 | A1 * | 10/2020 | |
| DE | 102019211822 | A1 * | 2/2021 | |
| DE | 102019124054 | A1 * | 3/2021 | |
| FR | 3088796 | A1 * | 5/2020 | |
| FR | 3096219 | A1 * | 11/2020 | ........ B60H 1/00295 |
| FR | 3099334 | A1 * | 1/2021 | |
| GB | 2548890 | A * | 10/2017 | ............... B60H 1/00 |
| KR | 20160039415 | A * | 4/2016 | |
| WO | WO-2011060340 | A1 * | 5/2011 | ........... B60H 1/2215 |
| WO | WO-2015027974 | A1 * | 3/2015 | ........... B60H 1/0065 |
| WO | WO-2019027362 | A1 * | 2/2019 | ........ B60H 1/00264 |
| WO | WO-2020161168 | A1 * | 8/2020 | ............. A61L 9/013 |
| WO | WO-2020229433 | A1 * | 11/2020 | ........ B60H 1/00295 |

* cited by examiner

INFRARED HEATING MODULE, VEHICLE AND SOFTWARE PROGRAM FOR PROVIDING CLIMATE CONTROL

TECHNICAL FIELD

The present disclosure generally relates to providing climate control within a vehicle. More particularly, the present disclosure relates to using an infrared (IR) heating module having one or more IR panels installed within a roof of a passenger cabin, the panel(s) being configured to radiate heat to passengers within the vehicle.

BACKGROUND

The heating system in a vehicle is designed to keep passengers warm while the temperatures outside are cold, wet or windy. In a conventional heating system for a vehicle, the engine's cooling system is directly linked to the heating system. As such, if the heating system is not working properly, it is also likely that the engine's cooling system may not be working properly either. As a result, a problem in either system could result in discomfort and potential danger to the passengers, depending on the severity of the weather.

There are a few basic components in a conventional heating system: the heater core, a blower motor/fan, heater hoses, a heater control valve, and the HVAC (heating, ventilation, air conditioning) control panel/assembly inside the cabin. The cooling system components that interact with the heating system are the coolant, thermostat, radiator, and water pump. The heater core is also utilized in the cooling system of the vehicle. Once a vehicle in operation reaches a threshold temperature, the thermostat opens and allows the coolant from the cooling system to circulate through the engine passages removing the heat from the engine, sending it into the radiator, and finally circulating warm air into the heater core that distributes heat into the cabin of the vehicle. The heater controls and blower fan are operated by the passengers in the vehicle, typically in the front console, and control how much heat comes into the cabin and at what rate by the speed of the blower motor/fan. The disadvantages of these conventional systems are varied. First, in order for the heater to operate properly, the cooling system must be in good operating condition. Given the interrelated nature of the cooling and heating systems, and the large number of parts involved, diagnosing which element requires repair by a professional, which can be costly and time consuming. Meanwhile, the vehicle may still be needed for operation by the user. In addition, conventional heating systems within vehicles typically require a lengthy pre-heating process, which is time consuming. In addition, in some jurisdictions, warming up a vehicle without a passenger being present inside is against the law due to the possibility of theft, even if passengers due so via a remote start feature.

One alternative to forced air heating systems is infrared light (IR). Infrared radiation is electromagnetic radiation that is not visible to the naked eye. While, radiation is often mistaken for being harmful, but not all radiation is dangerous to life. Infrared radiation is entirely safe and is indeed beneficial for human life. IR heaters work such that when in operation, infrared rays are emitted from the heater, travel through the air until they hit any object within their trajectory. The radiation is then absorbed by the object and causes its molecules to vibrate and produce heat from within. When the IR waves come into contact with a person, they travel inside the body and bring a feeling of warmth. Even objects around the body will absorb these infrared rays and then emit them towards any nearby person or object. When used in homes or other space heating applications, electric IR panels are particularly desirable because they do not have to be integrated with any fuel storage or pipelines and are easy to install and replace.

Thus, there is a need for a heater supplement or alternative which has the advantage of easy installation and replacement, while also being a safe, healthy and an independent heating alternative to conventional heating systems within vehicles.

SUMMARY

An infrared (IR) heating module for a vehicle having a passenger cabin is provided. The IR heating model comprises at least one IR panel; a controller coupled to the at least one IR panel for controlling operation of the IR heating module; and a power supply coupled to the controller for supplying power to the IR heating module. The IR heating module may be provided such that the at least one IR panel is adapted and configured to be installed in a roof within the passenger cabin of the vehicle. In embodiment, the power supply is configured to operate the at least one IR panel between 100 and 300 Watts. In another embodiment, the power supply provides power to the IR heating module independent of at least one of a battery and an engine of the vehicle. The IR heating module may be the primary method of heating objects or passengers within the vehicle. In other embodiments, it may be an auxiliary or supplemental heating method.

In a further embodiment, the IR heating module further comprises a thermostat coupled to the controller for detecting a temperature within the passenger cabin, wherein the controller is adapted and configured to turn on the module automatically when a temperature of the thermostat reaches a threshold value. In an embodiment, the controller is adapted and configured to turn on the IR heater module based on a user-initiated action. The user-initiated action may be at least one of, but is not limited to: opening a door of the vehicle, sitting a seat of the vehicle, initiating a remote start of the vehicle, manually sending a command signal to the controller, and sending a voice command to the controller. In addition, the at least one heating panel has a radiating surface area between 2 and 5 square meters.

Embodiments of a vehicle having an infrared (IR) heating module is also provided, the IR heating module having at least one IR panel for controlling a climate within a vehicle. The vehicle comprises: a cabin adapted and configured to house a plurality of passengers; a roof within an upper surface of the cabin; and a plurality of seats adapted and configured to seat a plurality of passengers within the cabin, wherein the at least one IR panel is installed within the roof of the vehicle. In one embodiment of the vehicle, the at least one IR panel is installed in a b-pillar of the roof. In another embodiment of the vehicle, the at least one IR panel is installed over at least one of the plurality of seats. In yet another embodiment of the vehicle, the IR heating module further comprises a power supply configured to output power from the at least one IR panel within a range of 100 and 300 Watts. The power supply may provide power to the IR heating module independent of at least one of a battery and an engine coupled to the vehicle.

In yet a further embodiment of the vehicle, the IR heating module comprises a thermostat for detecting a temperature within the cabin. The IR heating module of the vehicle may further comprise a controller, such that the controller is adapted and configured to turn on the at least one IR panel automatically when a temperature of the thermostat reaches a threshold value. Alternatively, the controller may also be adapted and configured to turn on the IR heating module based on a user-initiated action. The user-initiated actions may be at least one of, but are not limited to: opening a door of the vehicle, sitting a seat of the vehicle, initiating a remote start of the vehicle, manually sending a command signal to the controller, and sending a voice command to the controller.

Embodiments of a non-transitory machine-readable medium on which a program is stored for providing instructions to a controller of an infrared (IR) heating module within a vehicle are also provided. The IR heating module has at least one IR panel. The program, when executed by a processor, causes the processor to perform the following steps: detecting a temperature within a cabin of the vehicle based on an output of a thermostat within the vehicle; receiving a signal from the controller relating to the temperature detected; and initiating an operation of the at least one IR panel based on the received signal, wherein the at least one IR panel is installed within the roof of the vehicle. In an embodiment, the non-transitory machine-readable medium has a processor configured to perform the additional step of supplying power from the power supply to the at least one IR panel between 100 and 300 Watts. In another embodiment, the controller is adapted and configured via the program, to turn on the IR heating module based on a user-initiated action. The user-initiated actions may include, but are not limited to at least one of: opening a door of the vehicle, sitting in a seat of the vehicle, initiating a remote start of the vehicle, manually sending a command signal to the controller, and sending a voice command to the controller.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EMBODIMENTS

The present disclosure generally relates to providing climate control within a vehicle. More particularly, the present disclosure relates to using an infrared (IR) heating module having one or more IR panels installed within a roof of a passenger cabin, the IR panel(s) configured to radiate heat to passengers within the vehicle. Vehicles having the IR heating module installed with one or more IR panel configurations within the roof are also provided. In addition, embodiments of the invention include controller instructions embodied within a computer or software program stored on a non-transitory machine-readable medium and executed by the controller of the IR heating module are provided. These various embodiments of the present invention have the benefit and advantage of providing localized heat to passengers for supplemental climate control and improved passenger comfort at a low power output. In addition, the use of IR heating improves passenger health, while also having the added benefit of reducing load on the vehicle heating system, battery and engine. As a result, vehicle efficiency and extended range may also be achieved. Embodiments of the IR modules of the present invention may be used as the primary, or singular source of heating passengers within a vehicle. In other embodiments, the IR modules, may also be used in conjunction, or as an alternative to, conventional heating systems within a vehicle.

IR Module Assembly

Figure 1:
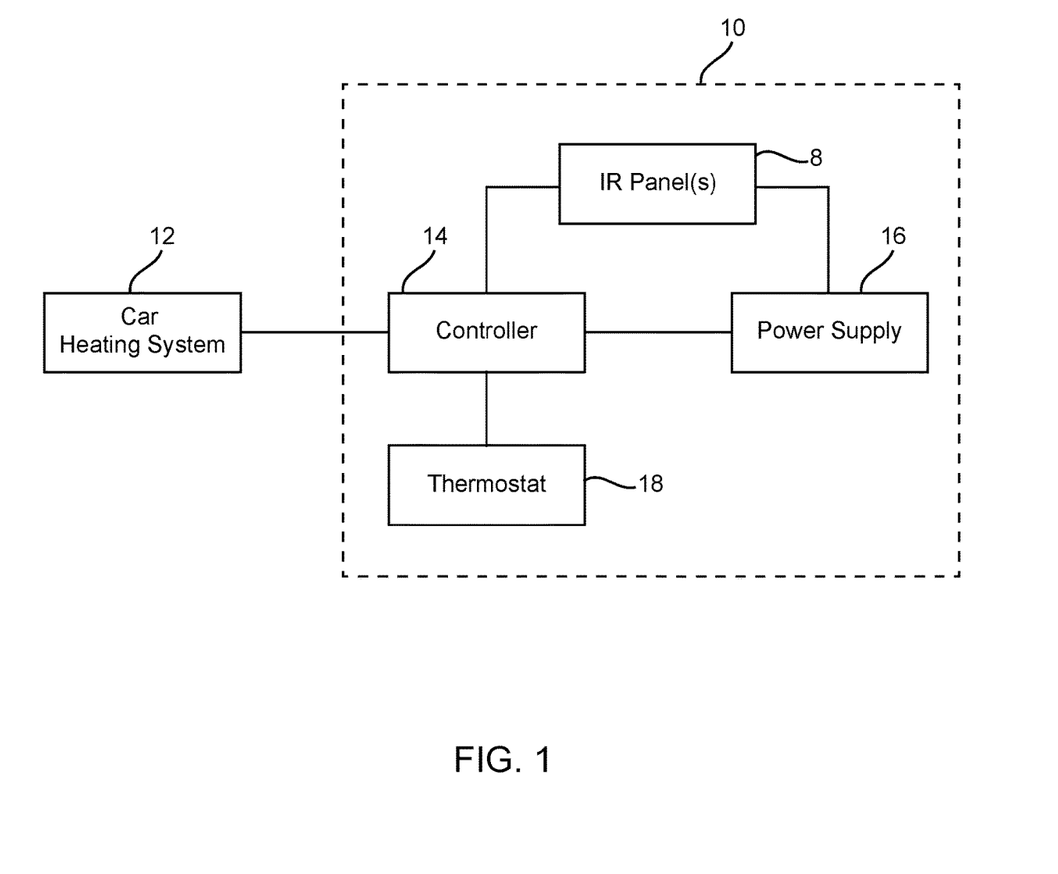
FIG. 1 is a block diagram of an embodiment of an IR module adapted and configured to be installed in a vehicle according to an embodiment of the present disclosure.

FIG. 1 is a block diagram of an embodiment of an IR module adapted and configured to be installed in a vehicle according to an embodiment of the present disclosure. The IR module 10 comprises at least one IR panel 8, a controller 14 and a power supply 16. In one embodiment, a thermostat 18 is also provided. The IR panel 8 may include multiple panels, or multiple groups of panels. The IR panel 8 is illustrated as a singular panel in the block diagram of FIG. 1 for simplicity. The IR panel 8 may be a FAR IR heating panel. In one embodiment, there are multiple IR panels 8a-n that are independently in communication with the controller. In another embodiment, there are multiple IR panels 8a-n that are in communication with each other and with the controller 14. As such, the invention envisions embodiments in which the IR panels 8a-n are connected together, through a common communication link with the controller 14, as well as embodiments in which there are independent communication links from the IR panel 8 to the controller 14. In addition, the IR panel 8 may be coupled to the controller via wireless or wired communications. The IR panel 8 is adapted and configured to be installed in a roof within the passenger cabin of a vehicle.

As noted above, the IR panel 8 is electrically and/or communicatively coupled to the controller 14. The controller 14 may include, but is not limited to, elements such as a processor or CPU, random access memory (RAM), read-only memory (ROM), input/output ports, timers and counters, interrupt controls, AC/DC converters, and the like. The controller 14 controls the operation, of the IR panel 8. In doing so, the controller 14 may operate one or more IR panels 8a-n independently, such that the one or more of the IR panels 8a-n may be in one state of operation (e.g., turned on, turned off, rotate horizontal, rotate vertical, 360 degree rotation, constant operation, intermittent operation, battery saver mode, change of radiation level (min-max), etc.), while another IR panel 8 may be in the same or a different state of operation. In addition, the controller 14 is either electrically coupled to, and/or is in communication with a thermostat 18. The thermostat 18 may be part of the vehicle heating system 12. The thermostat 18 may also be a separate thermostat 18 that is part of the IR module 10, as shown in the exemplary embodiment illustrated in FIG. 1. The controller 14 may also be adapted and configured to be electrically connected to or be in communication with other sensors, control systems or elements within the vehicle (e.g., HVAC, seating or motion sensors, user actuated control systems, etc.)

The IR module 10 includes a power supply 16 which may be independent from the vehicle heating system 12. In an embodiment, the power supply 16 is also independent of any of the vehicle's power system's such as the vehicle battery. In other embodiments, the power supply 16 may be coupled to, charged or recharged by the vehicle's battery. The power supply 16 may be a separate element from the controller 14 as illustrated in FIG. 1. In another embodiment, the power supply 16 is incorporated into the controller 14 or incorporated with the controller 14 for supplying power to the IR panel 8 of the IR heating module 10.

The power supply 16 is adapted and configured to operate each of the IR panels 8 with a power output within a range of 150-300 Watts. This power range provides the benefit of rapidly heating the interior cabin of the vehicle, while also providing a healthy type of IR radiation for passengers. In an embodiment, an IR panel 8 implemented, for example, using a FAR IR heating panel works in an opposite way from other heating systems. Instead of heating up the air, as conventional heating systems do, the IR panel 8 heats up the objects around it, including the passenger, or human body, which in turn, releases the heat into the air.

Vehicle and IR Module Configuration and Installation

Figure 2:
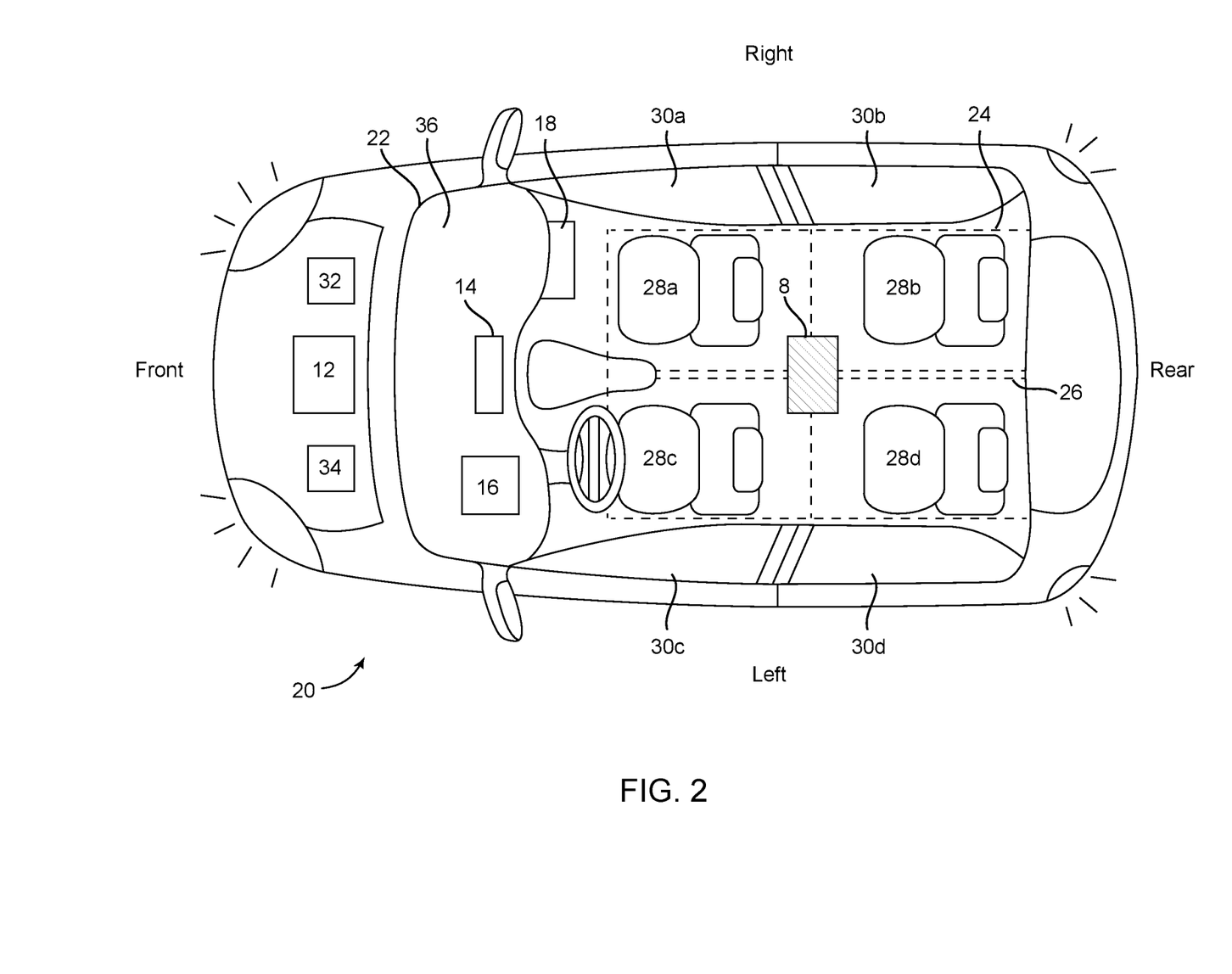
FIG. 2. is an aerial/plan view illustration of a vehicle having an infrared (IR) heating module installed in the roof for controlling a climate within the vehicle's cabin according to an embodiment of the present disclosure.
Figure 3:
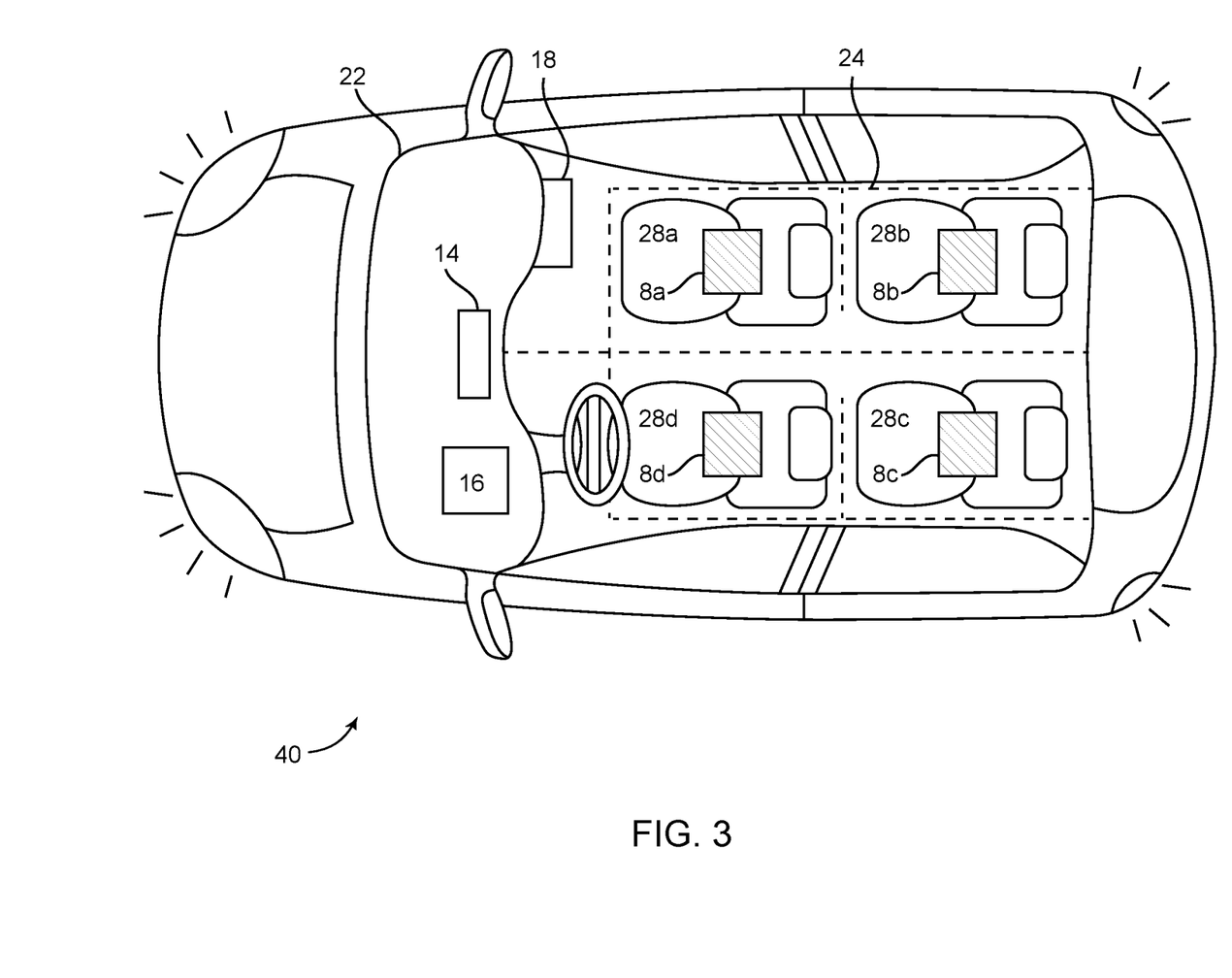
FIG. 3 is an aerial/plan view illustration of a vehicle having an infrared (IR) heating module for controlling a climate within the vehicle's cabin having a plurality of IR heating panels installed in the roof, the IR heating panels being aligned above the passenger seats according to an embodiment of the present disclosure.

FIGS. 2 and 3 are illustrations of vehicles 20 and 40 having an infrared (IR) heating module 10 for controlling a climate within the passenger cabin 22 according to embodiments of the present disclosure. The exemplary vehicles 20, 40 may be conventional petrol fuel or diesel operated vehicles. The vehicles 20, 40 may also be an electric, hybrid, autonomous, or other powered vehicle. While the vehicles 20, 40 of FIGS. 2 and 3, respectively, are illustrated as being a conventional sedan having an engine 32, battery 34 and vehicle heating system 12 (FIG. 2 only), the style/make illustrated in these embodiments are only for exemplary purposes. In addition, the elements of the vehicles 20 and 40 are illustrated as being oriented relative to the right, left, rear and front directions provided in the figures. However, these features may be positioned in other locations in the vehicles 20 and 40 as applicable for a given design in which an embodiment of the IR heating module 10 of the present disclosure is implemented. Further, a vehicle heating system 12 is illustrated in FIG. 2 such that the IR heating module 10 is an auxiliary heating mechanism, the present specification envisions that the IR heating module 10 may be the primary and/or sole source of heating passengers and/or objects within the passenger cabin 22.

In an embodiment, the vehicles 20, 40 have a 12V electric system, which serves as the power supply for the IR panel(s) 8. In this embodiment, the power consumption is approx. 300 W and there is no need for other power supplies. This has the advantage of minimizing power consumption and increasing efficiency. For example, for a ten minute preheating of a passenger cabin 22 on a cold morning, only 50 Watts of power is consumed (300 Watts/hour×10 min=50 Watts).

Turning to FIG. 2, the vehicle 20 includes a front portion external to the passenger cabin 22, which houses the vehicle engine 32, vehicle battery 34 and vehicle heating system 12. However, in some embodiments, portions of the vehicle heating system 12 may be located within the passenger cabin 22, for example, partially within the console 36. The passenger cabin 22 is enclosed by a roof 24, which is shown as transparent, and identified by dotted lines, so as to more easily illustrate the components within the vehicle 20 and passenger cabin 22. In this embodiment, the vehicle 20 includes four passenger seats 28a-28d situated between the left and right of the vehicle's four car doors 30a-30d. While this embodiment corresponds to a standard sedan, the vehicle 20 may include any number of seats 28, depending on the style and/or make of the vehicle 20. The passenger cabin 22 also includes a console 36 towards the front of the passenger cabin 22 of the vehicle 20. In an embodiment, the console 36 houses one or more of the controller 14, power supply 16 and thermostat 18 of the IR heating module 10. However, each these elements may be located in other portions of the passenger cabin 22, including the roof 24.

The vehicle heating system 12 may be a conventional heating system configured to blow forced heated air through vents to warm passengers within the passenger cabin 22 in connection with the operation of the vehicle engine 32. The IR heating module 10 of the present invention may be adapted and configured to work in conjunction with the vehicle heating system 12 as an auxiliary heating option, or alternatively as a primary heating option, with no vehicle heating system 12, as shown in FIG. 3. In addition, the IR heating module 10 may operate independent of the vehicle heating system 12, such that it is the sole method of warming passengers under certain circumstances. For example, in an embodiment, the IR heating module 10 may serve to preheat the passenger cabin 22, prior to utilization of the vehicle heating system 12, in response to a user-initiated action or pre-programmed event. These user-initiated action or pre-programmed events may include, but are not limited to: a scheduled or programmable, user-selected warming time, a threshold vehicle cabin 22 temperature reading, an external temperature reading, a door opening, operation of a remote start function, passenger motion sensor reading, passenger seat actuation, passenger voice command, detection of a failure or poor performance of operation of the vehicle heating system 12, change of status of a vehicle engine 32 or vehicle battery 34 operation, and reduction in threshold vehicle fuel level etc.

According to the present invention, the IR panel 8 is installed in the roof 24 of the vehicle 20 in order to provide the most direct IR radiation to the passenger(s). The IR panel 8 is illustrated in hashed lines to indicate that it is installed within the roof 24, rather than on the same plane and level within the passenger cabin 22 as the seats 28a-28d and other elements within the passenger cabin 24. In the embodiment illustrated in FIG. 2, the IR panel 8 is mounted substantially in the center of the roof 24 of the passenger cabin 22 along a center axis 26 running horizontally along the body of the vehicle 20. In another embodiment, the IR panel 8 is installed along a b-pillar of the roof 24, which those of ordinary skill in the art would understand to be the center pillar of the vehicle 20 between the driver door 30c and the passenger door 30a.

FIG. 3 illustrates yet another embodiment of a vehicle 40 if the present invention. Similar to FIG. 2, FIG. 3 provides an aerial plan view of the vehicle 40 having an infrared (IR) heating module 10 for controlling a climate within the passenger cabin 22 of the vehicle 40. As noted above, the exemplary IR heating module 10 of FIG. 3 is adapted and configured to provide the primary source of heat for passengers and/or objects within the passenger cabin 22, as no vehicle heating system 12 is provided within the vehicle 40.

The IR heating module 10 includes a plurality of IR heating panels 8a-8d installed in the roof 24. In this embodiment, the IR heating panels 8a-8d are aligned in the roof 24 substantially above the location of the passenger seats 28a-28d, respectively. While the IR panels 8a-8d are shown as aligned over the passenger seats 28a-28d, one or more IR panels 8a-8d may be installed in and around various locations within the roof 24 of the vehicle. In addition, while only four IR panels 8a-8d are illustrated in FIG. 3, other embodiments of the present invention may provide any number of IR panels 8a-n according to the desired vehicle design. The number (n) of IR panels 8a-n may or may not correspond to the number of passenger or passenger seats within the vehicle 40 according to the present invention.

Embodiments of the present invention include various positions for the IR panel 8. In one embodiment, illustrated in FIG. 2, a single IR panel 8 may be positioned in the middle of the roof 24. Alternatively, two smaller IR panels 8 may be provided in the roof 24. For example, one IR panel may be provided in front above the center console 36 towards the front of the vehicle 20, and one may provided towards the rear, above the center head rest (not shown). In other embodiments, IR panels 8a-8d may be positioned over each door window, next to the grab handles (not shown). Exemplary dimensions and associated power for the IR panel(s) 8a-n, may be as follows:

1 IR panel: power output 300-400 W, length 500 mm×width 200 mm;
2 IR panels: power output 150-200 W, length 250 mm×width 150 mm; and
4 IR panels: power output 100 W, length 150 mm×width 100 mm.

The IR panel(s) 8a-n of the present invention are designed to be as compact, and aesthetically pleasing as possible to compliment the interior design of the roof 24. For example, the IR panels 8a-8d may be hidden or relatively invisible to the passenger. To achieve this, in an embodiment, the roof 24, or portions thereof, are covered with an IR transparent and/or opaque fabric material that permits the IR heat waves of the IR panel 8 to be transmitted without making the IR panel 8 visible to the passenger. The fabric may be provided in the roof 24 only at the location of the IR panel 8, or across the entire roofline, or portions thereof. In an embodiment, the dimensions of the vehicle surface area of the vehicle interior or passenger cabin 22 are approximately 2-5 square meters. The surface area dimensions of the IR panel 8 or IR panels 8a-8d may be adjusted according to the vehicle size. Further, the size and number of IR panels 8a-n used may increase or decrease with a desired power output. One benefit and advantage of utilizing multiple IR panels 8a-n is that each of the IR panels 8 may be operated independently. For example, if only one passenger is in the vehicle 40, only the closest or selected IR panel 8a-n may be in operation. Additionally, if one of such IR panels 8a-n is not working, one or more of the remaining IR panels 8a-n–1 may still be in operation.

Controller Executed Program/Instructions Stored on a Non-Transitory Machine-Readable Medium The present invention includes embodiments of controller program or instructions executed by and/or stored within the controller 14. The controller instructions may be in the form of a computer program, software program, and/or software algorithm programmed on, or stored in a non-transitory machine-readable medium. The controller instructions may include execution of a number of user-initiated or automatic actions, some of which require incorporating signals and outputs form various systems within the vehicle (e.g., heating, HVAC, seating, emergency, weather). These instructions may include, but are not limited to: commands for operation of the IR module 10 based on a temperature of the passenger cabin 22, vehicle engine 32 or vehicle battery 34 availability; pre-programmed commands designed to save or conserve power, fuel or battery life; detection of an emergency vehicle status; and automatic, simultaneous or follow-on operations connected to other user actuated systems such as door opening, remote start, passenger cabin motion detection, and/or passenger seat actuation.

Figure 4:
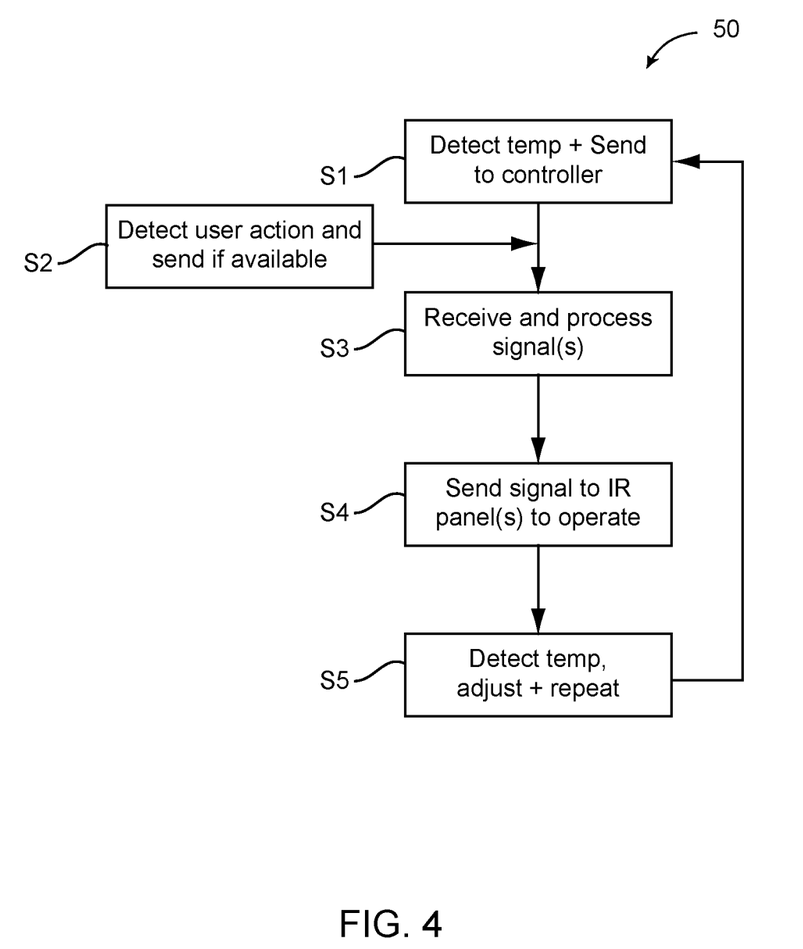
FIG. 4 is a flow chart illustrating an embodiment of an exemplary operation of a controller executed program stored on a non-transitory machine-readable memory medium for operating an IR module according to the present disclosure.

FIG. 4 is a flow chart illustrating an exemplary embodiment of the operation of a controller program/instruction executed by the controller 14 of the IR module 10 according to the present disclosure. While the steps S1-S4 of the computer program 40 are illustrated in a certain order, one or more of them may occur ongoing, simultaneously, or in a different order than is shown.

In step 1 (S1), a temperature inside a vehicle passenger cabin or external to the vehicle is detected and sent to the controller 14 of the IR module 10. In step 2 (S2), if a user-initiated action is present, that signal is also provided to the controller 14. In step 3 (S3), the controller 14 receives and processes the signal(s) and determines a course of action based on the stored instructions in the computer program, look-up table or algorithm. In step 4 (S4), a command signal is sent to the one or more IR panels 8. This command could include turning on or off one or more of the IR panels 8a-n, adjusting their output, rotating the IR panel etc. In step 5 (S5), the temperature within the passenger cabin is detected again, and the previously received command is confirmed, and or adjusted based stored instructions, and the process begins again by returning to S1.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An infrared (IR) heating module for a vehicle having a passenger cabin comprising:
   a plurality of IR panels, each IR panel configured for operation at a constant power output or in a range between a minimum power output and a maximum power output;

a controller coupled to the plurality of IR panels for controlling operation of the IR heating module;
a power supply coupled to the controller for supplying power to the IR heating module,
wherein the plurality of IR panels are adapted and configured to be installed in a roof within the passenger cabin of the vehicle, and
wherein one or more of:
   at least one of the plurality of IR panels is disposed in the roof along a center axis of the roof,
   at least one of the plurality of IR panels is disposed in the roof adjacent to a b-pillar of the vehicle, and
   one of the plurality of IR panels is disposed in the roof above each of a plurality of seats of the vehicle; and
a thermostat coupled to the controller for detecting a first temperature and a second temperature within the passenger cabin, wherein the controller is adapted and configured to turn on the plurality of IR panels automatically based on the first temperature detection and stored instructions and, in response to detecting a subsequent temperature within the passenger cabin after detecting the first temperature, at least one of confirm a previous command signal communicated to the plurality of IR panels or communicate a subsequent command signal to the plurality of IR panels to turn off or adjust an output of selected ones of the plurality of IR panels based on the second temperature detection and stored instructions,
wherein the controller is further adapted and configured such that each selected ones of the plurality of IR panels operates at its constant power output or a constant power setting between its minimum power output and maximum power output until the second temperature detection based on stored instructions.

2. The IR heating module of claim 1, wherein the power supply is configured to operate each IR panel of the plurality of IR panels between 100 and 300 Watts.

3. The IR heating module of claim 1, wherein the power supply provides power to the IR heating module independent of at least one of a battery and an engine of the vehicle.

4. The IR heating module of claim 1, wherein the controller is further adapted and configured to turn on the plurality of IR panels based on a user-initiated action.

5. The IR heating module of claim 4, wherein the user-initiated action is at least one of: opening a door of the vehicle, sitting in a seat of the vehicle, initiating a remote start of the vehicle, manually sending a command signal to the controller, and sending a voice command to the controller.

6. The IR heating module of claim 1, wherein the plurality of IR panels have a radiating surface area between 2 and 5 square meters.

7. A vehicle having an infrared (IR) heating module having a plurality of IR panels for controlling a climate within a vehicle, the vehicle comprising:
   the plurality of IR panels of the IR heating module, each IR panel configured for operation at a constant power output or in a range between a minimum power output and a maximum power output;
   a cabin adapted and configured to house a plurality of passengers;
   a roof within an upper surface of the cabin;
   a plurality of seats adapted and configured to seat a plurality of passengers within the cabin,
   wherein the plurality of IR panels are installed within the roof of the vehicle, and
   wherein one or more of:
      at least one of the plurality of IR panels is disposed in the roof along a center axis of the roof,
      at least one of the plurality of IR panels is disposed in the roof adjacent to a b-pillar of the vehicle, and
      one of the plurality of IR panels is disposed in the roof above each of the plurality of seats of the vehicle; and
   a thermostat coupled to a controller for detecting a first temperature and a second temperature within the cabin, wherein the controller is adapted and configured to turn on the plurality of IR panels automatically based on the first temperature detection and stored instructions and, in response to detecting a subsequent temperature within the passenger cabin after detecting the first temperature, at least one of confirm a previous command signal communicated to the plurality of IR panels or communicate a subsequent command signal to the plurality of IR panels to turn off or adjust an output of selected ones of the plurality of IR panels based on the second temperature detection and stored instructions,
   wherein the controller is further adapted and configured such that each selected ones of the plurality of IR panels operates at its constant power output or a constant power setting between its minimum power output and maximum power output until the second temperature detection based on stored instructions.

8. The vehicle of claim 7, wherein the IR heating module further comprises a power supply configured to output power from each IR panel of the plurality of IR panels within a range of 100 and 300 Watts.

9. The vehicle of claim 7, wherein the power supply provides power to the IR heating module independent of at least one of a battery and an engine coupled to the vehicle.

10. The vehicle of claim 7, wherein the controller is further adapted and configured to turn on the plurality of IR panels based on a user-initiated action.

11. The vehicle of claim 10, wherein the user-initiated action is at least one of: opening a door of the vehicle, sitting in a seat of the vehicle, initiating a remote start of the vehicle, manually sending a command signal to the controller, and sending a voice command to the controller.

12. A non-transitory machine-readable medium on which a program is stored for providing instructions to a controller of an infrared (IR) heating module within a vehicle, the IR heating module having a plurality of IR panels, each IR panel configured for operation at a constant power output or in a range between a minimum power output and a maximum power output, the program, when executed by a processor, causing the processor to perform:
   detecting a temperature within a cabin of the vehicle based on an output of a thermostat within the vehicle;
   receiving a signal from the controller relating to the temperature detected;
   initiating an operation of the plurality of IR panels based on the received signal,
   wherein the plurality of IR panels are installed within the roof of the vehicle, and
   wherein one or more of:
      at least one of the plurality of IR panels is disposed in the roof along a center axis of the roof,
      at least one of the plurality of IR panels is disposed in the roof adjacent to a b-pillar of the vehicle, and
      one of the plurality of IR panels is disposed in the roof above each of a plurality of seats of the vehicle;
   detecting a first temperature and a subsequent temperature within the cabin;

turning on the plurality of IR panels automatically based on the first temperature detection and stored instructions; and in response to detecting the subsequent temperature within the passenger cabin after detecting the first temperature, at least one of confirming a previous command signal communicated to the plurality of IR panels or communicating a subsequent command signal to the plurality of IR panels to turn off or adjust an output of selected ones of the plurality of IR panels based on a second temperature detection and stored instructions such that each selected ones of the plurality of IR panels operates at its constant power output or a constant power setting between its minimum power output and maximum power output until the second temperature detection based on stored instructions.

13. The non-transitory machine-readable medium of claim 12, wherein the processor is configured to perform the step of supplying power from a power supply to each IR panel of the plurality of IR panels between 100 and 300 Watts.

14. The non-transitory machine-readable medium of claim 12, wherein the controller is further adapted and configured to turn on the plurality of IR panels based on a user-initiated action.

15. The non-transitory machine-readable medium of claim 14, wherein the user-initiated action is at least one of opening a door of the vehicle, sitting in a seat of the vehicle, initiating a remote start of the vehicle, manually sending a command signal to the controller, and sending a voice command to the controller.

16. The IR heating module of claim 1, wherein each of the plurality of IR panels disposed in the roof above each of the plurality of seats of the vehicle is independently controllable.

17. The vehicle of claim 7, wherein each of the plurality of IR panels disposed in the roof above each of the plurality of seats of the vehicle is independently controllable.

18. The IR heating module of claim 1, wherein an operation cycle is defined between when the controller turns on the plurality of IR panels automatically based on the first temperature detection and stored instructions and when the controller turns off the plurality of IR panels automatically based on the second temperature detection and the stored instructions, and wherein the controller is further adapted and configured such that each selected ones of the plurality of IR panels operates at its constant power output or the constant power setting between its minimum power output and maximum power output based on stored instructions during the operation cycle.

19. The IR heating module of claim 1, wherein the selected one of the plurality of IR panels includes two or more constant power IR panels each configured for operation at its respective constant power output, and wherein the controller is further adapted and configured such that each selected constant power IR panel operates at its constant power output based on stored instructions during the operation cycle.

20. The vehicle of claim 7, wherein the IR heating module including the plurality of IR panels is the primary method of heating objects or passengers within the vehicle.

* * * * *